(12) United States Patent
Inukai (10) Patent No.: US 8,988,583 B2
(45) Date of Patent: Mar. 24, 2015

(54) IMAGE-PICKUP APPARATUS AND IMAGE-PICKUP SYSTEM HAVING LIGHT EMITTING MEMBER

(71) Applicant: Canon Kabushiki Kaisha, Tokyo (JP)

(72) Inventor: Hiroaki Inukai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 14/029,235

(22) Filed: Sep. 17, 2013

(65) Prior Publication Data

US 2014/0078380 A1 Mar. 20, 2014

(30) Foreign Application Priority Data

Sep. 19, 2012 (JP) ................... 2012-205448

(51) Int. Cl.
*H04N 5/225* (2006.01)
*G03B 19/12* (2006.01)

(52) U.S. Cl.
CPC ..................... *G03B 19/12* (2013.01)
USPC ............................ 348/344; 348/219.1; 348/371

(58) Field of Classification Search
USPC .................... 348/219.1, 222.1, 344, 371
See application file for complete search history.

(56) References Cited

FOREIGN PATENT DOCUMENTS

JP 2008-175920 A 7/2008

*Primary Examiner* — Gevell Selby
(74) *Attorney, Agent, or Firm* — Cowan, Liebowitz & Latman, P.C.

(57) ABSTRACT

An image-pickup apparatus is operable in a first mirror driving mode where a motor rotates a mirror cam member in a first direction so as to move a mirror at a first speed and is operable in a second mirror driving mode where the motor rotates the mirror cam member in as second direction so as to move the mirror at a second speed slower than the first speed. When start of taking an image is instructed, a light emitting member starts a pre-flush operation before the mirror cam member starts to rotate in a case where the image-pickup apparatus operates in the first mirror driving mode, and the light emitting member starts the pre-flash operation after the mirror cam member starts to rotate in a case where the image-pickup apparatus operates in the second mirror driving mode.

6 Claims, 10 Drawing Sheets

IMAGE-PICKUP APPARATUS AND IMAGE-PICKUP SYSTEM HAVING LIGHT EMITTING MEMBER

BACKGROUND OF THE INVENTION

1. Field of the Invention

The present invention relates to an image-pickup apparatus having a light emitting member operating flash operation for taking an image and pre-flash operation for deciding amount of luminescence of the flash operation.

2. Description of the Related Art

A quick return mirror (hereinafter, referred to as a "mirror") reciprocating between a position where the mirror comes into light path and a position where the mirror retracts from the light path is formed on a single-lens reflex camera of an image-pickup apparatus.

The mirror leads the light flux to an optical finder at a mirror-down position where the mirror comes into the light path and leads the light flux to an image-pickup element at a mirror-up position where the mirror retracts from the light path.

In a mirror-up operation due to talking a picture, the collision sound is generated since the mirror collides with a positioning member formed on a mirror-up end.

Therefore, changing of driving speed of the mirror is proposed so as to reduce the collision sound generated at driving of the mirror.

In Japanese Patent Laid-Open No. 2008-175920, an image-pickup apparatus having a first driving mechanism of a mirror by rotating a motor in a first direction and a second driving mechanism of the mirror by rotating the motor in a second direction opposite to the first direction at the mirror-up operation is disclosed. Then, when the motor is rotated in the second direction, the collision sound at the mirror-up is decreased since the motor is driven at a speed slower than a speed in the case where the motor rotates in the first direction. That is to say, the image-pickup apparatus is capable of changing the driving speed of the mirror by switching a normal shooting mode where the motor is rotated in the first direction and a silent sound shooting mode where the motor is rotated in the second direction.

However, a release time lag in the silent sound shooting mode of the image-pickup apparatus disclosed in Japanese Patent Laid-Open No. 2008-175920 is longer since the driving speed of the mirror is slower so as to decrease the collision sound at the mirror-up.

Photometry operation is operated by operating a pre-flash operation after pushing a release button when taking an image used a strobe shooting. Therefore, in the silent sound shooting mode, images of closing one's eyes increase since interval between the pre-flash operation and flesh operation for exposure is longer and objects reflexively close their eyes by the pre-flash operation.

SUMMARY OF THE INVENTION

In view of the problem, the present invention provides an image-pickup apparatus capable of operating a preferable strobe emission so as to prevent images of closing one's eyes at a strobe shooting in both a normal shooting mode and a silent sound shooting mode.

An image-pickup apparatus as one aspect of the present invention includes a release button configured to instruct start of taking an image, a light emitting member configured to operate a flash operation for taking the image and a pre-flash operation for determining an amount of luminescence of the flash operation, a mirror capable of moving between a first position where the mirror comes into an optical path so as to introduce a light beam to a finder and a second position where the mirror is retracted from the optical path, a mirror driving member configured to drive the mirror, a motor, and a mirror cam member that has a cam portion transmitting a driving force from the motor to the mirror driving member.

The image-pickup apparatus is operable in a first mirror driving mode where the motor rotates the mirror cam member in a first direction so as to move the mirror from the first position to the second position at a first speed and is operable in a second mirror driving mode where the motor rotates the mirror cam member in a second direction opposite to the first direction so as to move the mirror from the first position to the second position at a second speed slower than the first speed. And when the start of taking the image is instructed by the release button, the light emitting member starts the pre-flush operation before the mirror cam member starts to rotate in a case where the image-pickup apparatus operates in the first mirror driving mode, and the light emitting member starts the pre-flash operation after the mirror cam member starts to rotate in a case where the image-pickup apparatus operates in the second mirror driving mode.

Further features of the present invention will become apparent from the following description of exemplary embodiments with reference to the attached drawings.

DESCRIPTION OF THE PREFERRED EMBODIMENTS

A preferable embodiment of the present invention is described in detail on the basis of an attached drawing as follows.

Figure 1A:
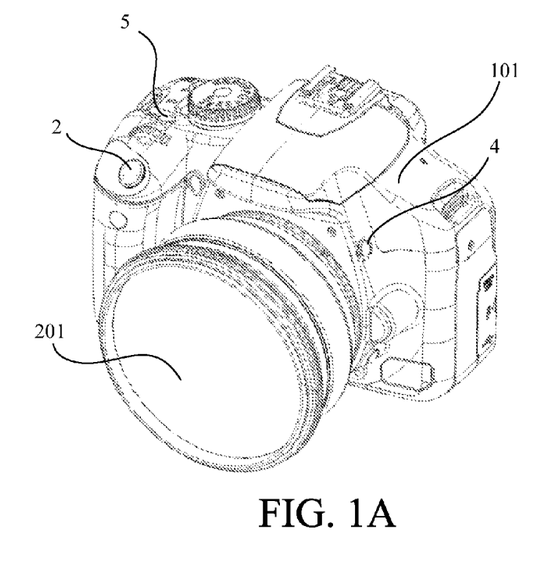
FIGS. 1A and 1B are respectively a perspective view and a central sectional view of an image-pickup apparatus that is one example of the embodiment of the present invention.
Figure 1B:
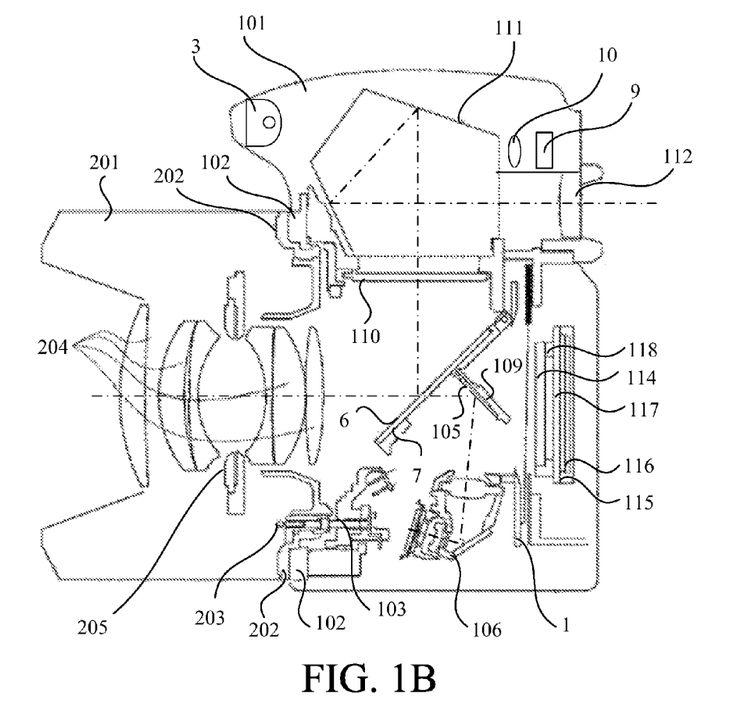

FIG. 1A is a perspective view of an image-pickup apparatus that is one example of the embodiment of the present invention, and FIG. 1B is a central sectional view of the image-pickup apparatus.

An image-pickup apparatus 101 is a digital camera that is photoelectrically converts an object image into image information by an image-pickup element such as a CCD or a CMOS, and records the image information on an electronic recording medium such as an arbitrary memory.

A release button 2 instructing taking an image is a two step switch, a state where the switch is lightly pushed to a first step so as to turn on a first switch is called "halfway pushing" (SW1), and photometry and AF (automatic focusing) are operated in the state. A state where the switch is further pushed from the halfway pushing to second step so as to turn on a second switch is called "entire pushing" (SW2), and start of taking an image is instructed by the entire pushing.

A built-in strobe 3 operates a pop-up operation by instruction of a strobe button 4. In taking an image used the built-in strobe 3, both operations of pre-flash operation for deciding amount of luminescence of flash operation before taking an image and flash operation for taking an image are operated.

A mirror driving mode selection button 5 is controlled by a photographer so as to arbitrarily select a normal shooting mode (a first mirror driving mode) where a mirror unit including a main mirror 6 is driven at high speed and a silent sound shooting mode (a second mirror driving mode) where the mirror unit is driven at low speed.

An image-pickup lens 201 detachable from the image-pickup apparatus 101 comprises an image-pickup system along with the image-pickup apparatus 101. The image-pickup lens 201 is fixed by a mount portion 102 of the image-pickup apparatus 101 and a mount portion 202 of the image-pickup lens 201. When the image-pickup lens 201 is attached, a contact portion 103 of the image-pickup apparatus 101 contacts a contact portion 203 of the image-pickup lens 201. The image-pickup apparatus 101 detects attachment of the image-pickup lens 201 by this electrical connection. Further, communication so as to supply electric power from the image-pickup apparatus 101 to the image-pickup lens 201 and control the image-pickup lens 201 through the contact portions 103 and 203 is performed. The light flux through a lens group 204 of the image-pickup lens 201 is incident to the main mirror 6. The light flux through the lens group 204 is adjusted by a diaphragm 205.

The main mirror 6 is a half mirror and is fixed to a main mirror holing member 7. The light flux reflected by the main mirror 6 is led to a finger. Additionally, the light flux through the main mirror 6 is reflected downward by a sub mirror 105 fixed on a sub mirror holding member 109 and led to a focus detection unit 106. The mirror unit comprises the main mirror 6, the main mirror holding member 7, the sub mirror 105 and the sub mirror holding member 109.

The focus detection unit 106 detects the defocus amount of the lens group 204, and operates the lens driving amount so as to focus the lens group 204. Operated lens driving amount is sent to the image-pickup lens 201 through the contact portions 103 and 203. The image-pickup lens 201 controls a motor on the lens side (not shown) so as to move a focus lens which is a part of the lens group 204, and as a result, focusing is performed.

The main mirror 6 leads the light flux to the finder at a mirror-down position (a first position) where the main mirror 6 comes into the light path and the light flux incident to a focusing screen 110 focuses an object image on the focusing screen 110. Photographers observe the object image on the focusing screen 110 through a pentaprism 111 and an ocular lens 112. Additionally, a photometry sensor 9 measuring object brightness by a reflected light from the object and a photometry lens 10 imaging the light flux from the object on the photometry sensor 9 are arranged near the finder.

A focal plane shutter 1 is arranged behind the sub mirror 105.

An optical low-pass filter 114 is arranged behind the focal plane shutter 1. An image-pickup element 116 which converts an optical image hold by an image-pickup element holder 115 into an electrical signal and a cover member 117 which protects the image-pickup element 116 are arranged behind the optical low-pass filter 114. A holding member 118 holds the optical low-pass filter 114 and seals between the optical low-pass filter 114 and the cover member 117.

The mirror unit including the main mirror 6 is capable of moving between the mirror-down position where the mirror comes into the light path and a mirror-up position (a second position) where the mirror retracts from the light path. The mirror unit including the main mirror 6 moves the mirror-up position (the second position) where the mirror retracts from the light path when taking an image and the light flux through the optical low-path filter 114 and the cover member 117 is incident to the image-pickup element 116.

Figure 2:
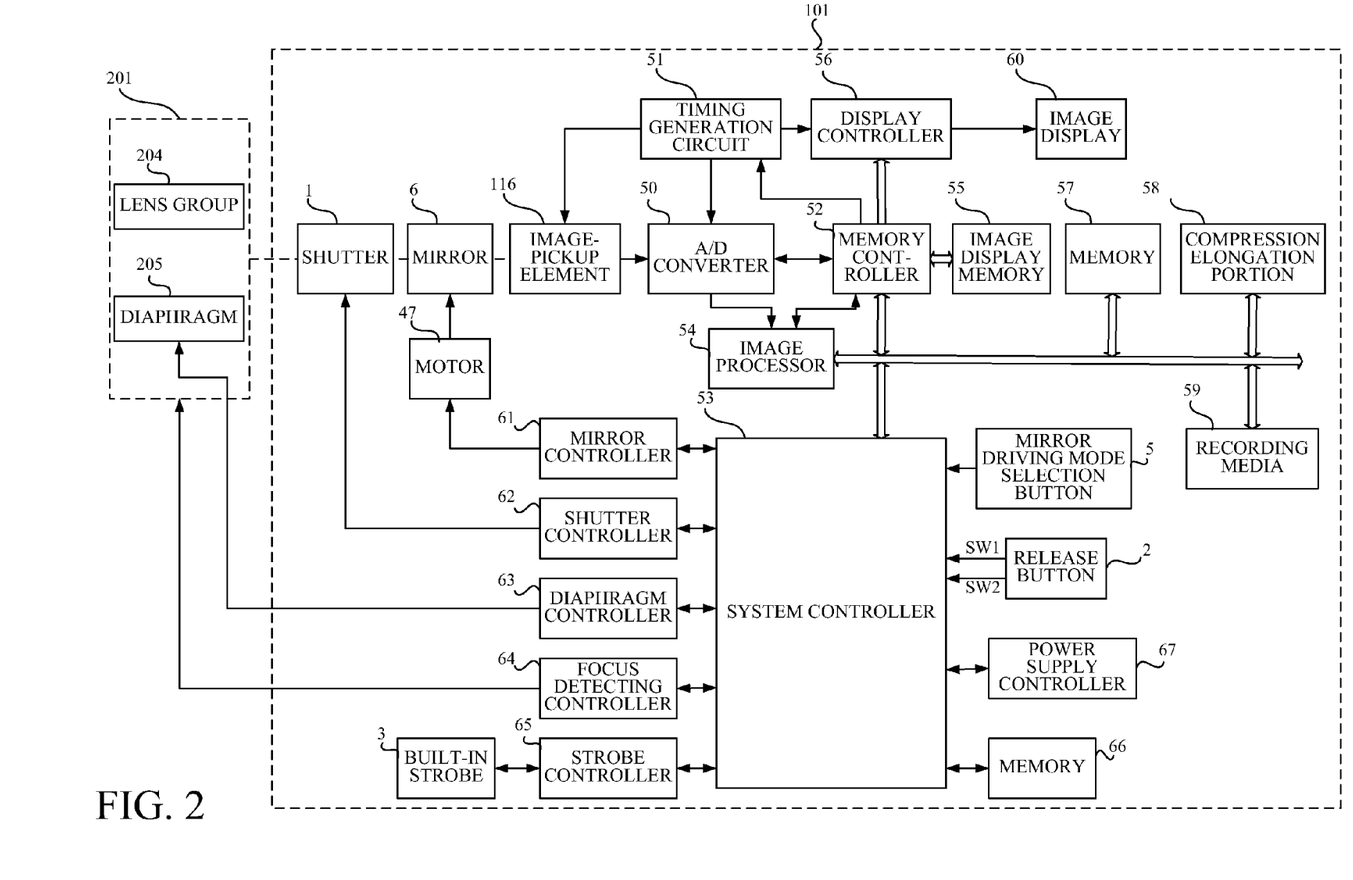
FIG. 2 is a block diagram of the image-pickup apparatus.

Next, configuration of control system of the image-pickup apparatus 101 is explained by using a block diagram of the image pickup apparatus 101 illustrated in FIG. 2.

An A/D converter 50 converts an analog image signal from the image-pickup element 116 into a digital image data. The data output from the A/D converter 50 is written into an image display memory 55 or a memory through an image processor 54 and a memory controller 52 or directly through the memory controller 52.

A timing generation circuit 51 supplies clock signals and control signals to the image-pickup element 116 and the A/D converter 50, and is controlled by the memory controller 52 and a system controller 53.

The memory controller 52 controls the A/D converter 50, the timing generation circuit 51, the image processor 54, the image display memory 55, a display controller 56, a memory 57, and a compression elongation portion 58.

The system controller 53 is comprised by a microcomputer unit including a CPU, and controls the entire camera by executing a program stored in a memory 66.

The image processor 54 performs a predetermined process such as pixel interpolating processing and color conversion processing to the image data from the A/D converter 50 or the memory controller 52.

The memory 57 has an amount of memory enough to store the predetermined number of the image pickup images.

The compression elongation portion 58 compresses and elongates the image data read out from the memory 57 according to the predetermined image compression method (e.g. adaptive discrete cosine transform). The terminated image data is written into the memory 57 and is recorded in a detachable recording media 59 which is comprised by a non-volatility memory such as a flush memory. Additionally, the compression elongation portion 58 reads out the image data of the recording media 59 to the memory 57, writes the image data to the image display memory 55 through the image processor 54 and the memory controller 52 and is used for displaying an image display 60 by the image controller 56.

A mirror controller 61 controls a motor 47 so as to operate the mirror unit including the main mirror 6 and a shutter controller 62 controls the focal plane shutter 1. A diaphragm controller 63 controls the diaphragm 205 and a focus detecting controller 64 controls focusing of the image-pickup lens 201. A strobe controller 65 controls an emission of a strobe light of the built-in strobe 3.

The memory 66 stores a constant, a variable, and a program for operating of the system controller 53, and records a various program regarding processing along with taking an image.

A power supply controller 67 comprises a power supply detecting circuit, a DC-DC convertor and a switching circuit switching a circuit block for supplying a power. The power supply controller 67 operates the presence or absence of attaching of the power supply, a kind of the power supply, and a detection of an electric residual quantity, and controls the DC-DC convertor based on a detecting result and an instruction of the system controller 53 so as to supply the power to each part for as long as is needed.

Hereinafter, a configuration of the mirror driving mechanism is described referring to FIG. 3.

Figure 3A:
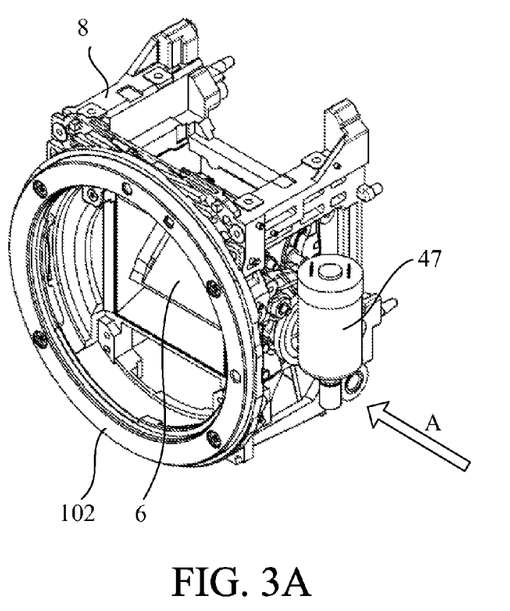
FIGS. 3A and 3B are respectively a perspective view and an exploded perspective view of a mirror driving mechanism of the image-pickup apparatus.
Figure 3B:
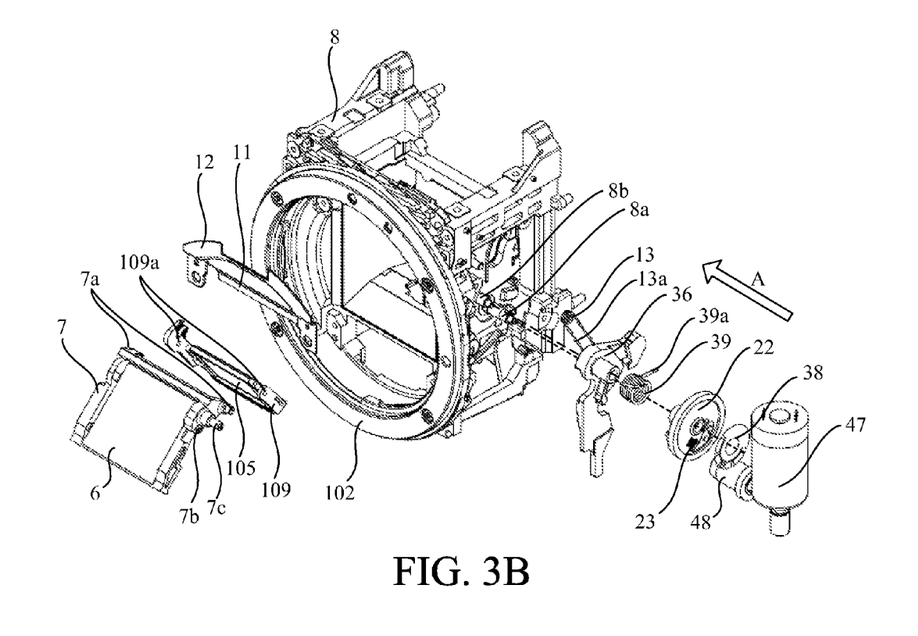

FIG. 3A is a perspective view of the mirror driving mechanism of the image-pickup apparatus 101 and FIG. 3B is an exploded perspective view of the mirror driving mechanism of the image-pickup apparatus 101.

The mirror unit comprising the main mirror 6, the main mirror holding member 7, the sub mirror 105 and the sub mirror holding member 109 is attached in a mirror box 8.

The main mirror 6 is fixed on the main mirror holding member 7 and is rotatably supported centering on an axis portion 7a of the main mirror holding member 7 with respect to the mirror box 8. Additionally, the sub mirror 105 is fixed on the sub mirror holding member 109. The sub mirror holding member 109 is rotatably supported centering on a hinge hole 109a with respect to an axis portion 7b of the main mirror holding member 7.

A mirror-up stopper 11 is used for determining the position when the mirror unit including the main mirror 6 retracts from a mirror-up position outside the light path, and is arranged in a mirror-up stopper holding member 12 fixed on the mirror box 8.

A mirror cam gear 22 is formed on the side surface of the mirror box 8 and rotates centering on an axis 8a through a reduction gear 48 from the motor 47. The motor 47 is not a special motor such as a vibrational motor and a linear motor but a general direct current motor. The energization to the motor 47 is controlled by the mirror controller 61 through the system controller 53.

The position detector 23 is fixed on the side surface of the mirror cam gear 22 so as to detect the rotational position of the mirror cam gear 22. The position detector 23 contacts with a pattern portion 38 formed on the flexible printed substrate according to the position of the mirror cam gear 22, and therefore, the image-pickup apparatus 101 detects the rotational position of the mirror cam gear 22.

A mirror driving lever (a mirror driving member) 36 is formed on the side surface of the mirror box 8 and reciprocates centering on an axis portion 8b. A cam follower 36a abutting against a cam top portion (a portion where a lift is zero) 22a and a cam lift portion 22b (a part connecting a cam bottom to a cam top) of the mirror cam gear 22 is formed on the mirror driving lever 36. The mirror driving lever 36 operates the mirror-up operation from the mirror-down position to the mirror-up position of the mirror unit and the mirror-down operation from the mirror-up position to the mirror-down position by using the driving force of the motor 47 transmitted from the mirror cam gear 22.

An arm portion 39a of a mirror-up spring 39 is hanged to the mirror driving lever 36 so that the mirror-up spring 39 urges in a counterclockwise direction when the right side surface of the main mirror 6 is seen from an "A" direction of FIGS. 3A and 3B.

An arm portion 13a of a mirror-down spring 13 is hanged to an axis portion 7c of the main mirror holding member 7 so that the mirror-down spring 13 urges in a counterclockwise direction when the right side surface of the main mirror 6 is seen from an "A" direction of FIGS. 3A and 3B.

Hereinafter, each component of the mirror driving mechanism of the mirror-up operation from the mirror-down position to the mirror-up position of the mirror unit including the main mirror 6 and the mirror-down operation from the mirror-up position to the mirror-down position is described by using FIGS. 4A-4N. In each figure, a cam portion of the mirror cam gear 22 is only displayed, and the mirror box 8 is omitted.

Figure 5:
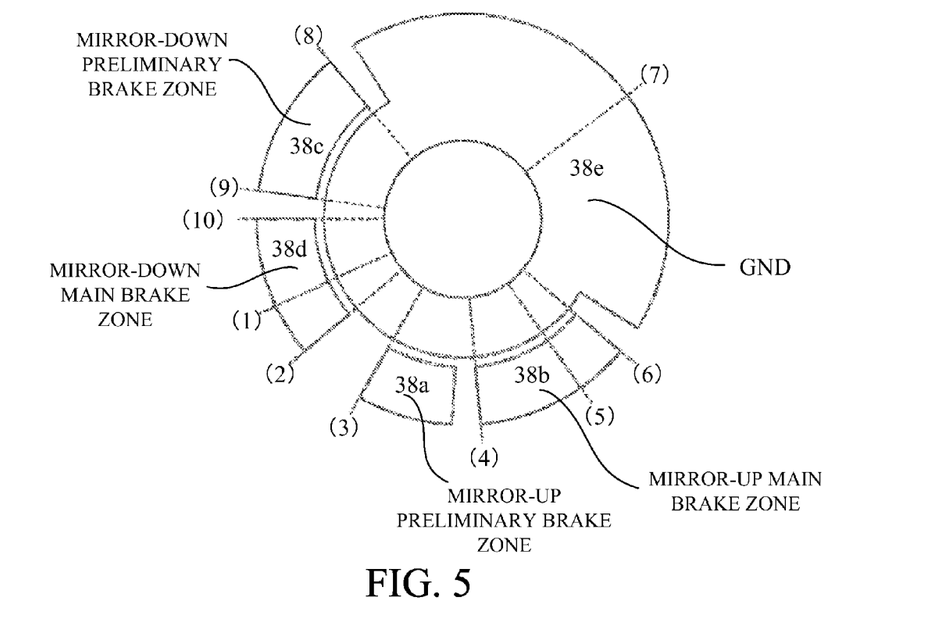
FIG. 5 is a schematic diagram illustrating a relationship between a position detector formed on a mirror cam gear of the image-pickup apparatus and a pattern formed on a flexible printed substrate.

Additionally, FIG. 5 illustrates a relationship between the position detector 23 formed on the mirror cam gear 22 of the image-pickup apparatus and a pattern formed on the flexible printed substrate. Zones 38a-38e of the pattern portion 38 formed on the flexible printed substrate and a ground portion 38e is conducted by the position detector 23 so that the image-pickup apparatus 101 detects the position of the mirror cam gear 22.

First, the state of each component of the mirror driving mechanism in the normal shooting mode (a first mirror driving mode) where the mirror unit including the main mirror 6 drives at high speed (a first speed) is described.

<Mirror-Up Operation>

1: Initial State

Figure 4A:
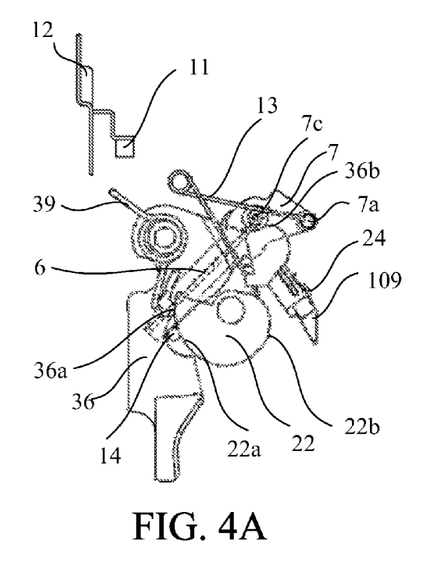
FIGS. 4A-4N are schematic diagrams illustrating the state of each component of the mirror driving mechanism of the image-pickup apparatus.

FIG. 4A illustrates the state of each component of the mirror driving mechanism on the initial state.

The cam follower 36a of the mirror driving lever 36 abuts against the cam top portion 22a of the mirror cam gear by the urging force of the mirror-up spring 39 so that the counterclockwise rotation of the mirror driving lever 36 is prevented.

Additionally, the axis portion 7c of the main mirror holding portion 7 holding the main mirror 6 is urged in a mirror-down operational direction (a counterclockwise direction) by the mirror-down spring 13. Moreover, the main mirror holding member 7 abuts against the main mirror down stopper 14 positioned in the mirror box 8. Therefore, the main mirror 6 and the main mirror holding member 7 are held on the mirror-down position. Then, an interval between the axis portion 7c of the main mirror holding member 7 and the cam 36b of the mirror driving member 36 generates. Even if an error of the position of the mirror driving lever 36 occurs, the positions of the main mirror 6 and the main mirror holding member 7 are held on proper position and the light flux passed the image-pickup lens 201 is led to the finder by the main mirror 6.

The sub mirror holding member 109 holding the sub mirror 105 is urged in the mirror-down operational direction by a spring (not shown) and abuts against a sub mirror down stopper 24 positioned inside the mirror box 8. Accordingly, the sub mirror 105 and the sub mirror holding member 109 are held on the mirror-down position.

The mirror cam gear 22 stops at the position illustrated in figure. Then, the position detector 23 provided with the mirror cam gear 22 so as to detect the position of the mirror cam gear 22 is positioned at a mirror-down main brake zone 38d of the pattern portion 38 of the flexible printed substrate (a position of (1) illustrated in FIG. 5).

When operation of an instruction of taking an image is started by the release button 2, the motor 47 is energized, the mirror cam gear 22 rotates in a counterclockwise direction (a first direction) centering on the axis portion 8a of the mirror box 8 in a counterclockwise direction (a first direction) through the reduction gear 48, and the mirror driving mechanism is transited to a mirror-up start state.

When taking a image used the built-in strobe 3, photometry operation is operated by a pre-flash operation of the built-in strobe 3 while transiting to the mirror-up start state after pushing the release button 2, in other words, before the start of the rotation of the mirror cam gear 22. The Photometry operation is operated by the pre-flash operation of the built-in strobe 3, light-flux which is reflected on the object and passes the lens group 204 of the image-pickup lens 201 is led to the photometry sensor 9 formed near the finder by the main mirror 6 positioned at the mirror-down position, and photometry operation is operated.

The rotational speed of the mirror cam gear 22 is set to being higher than the rotational speed at the mirror-up operation in the silent sound shooting mode (the second mirror driving mode) described below.

2: Mirror-Up Operation Start State

Figure 4B:
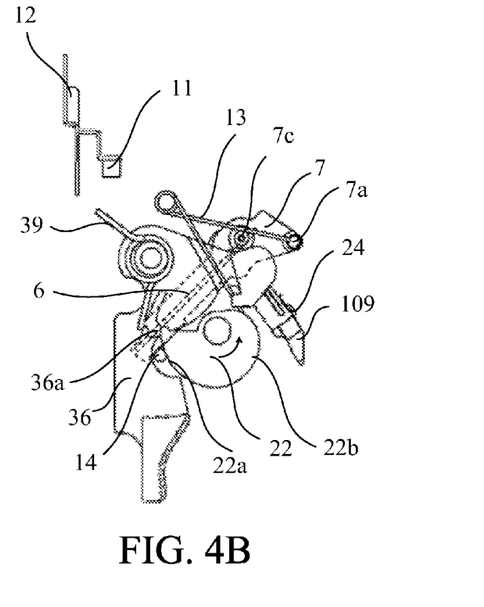

FIG. 4B illustrated the state of each component of the mirror driving mechanism before the start of the mirror-up operation.

Hereafter, changing parts from the above-mentioned state is only described, and explanation of changeless parts is omitted.

The mirror driving mechanism is transited to the state before the abutment of the cam top portion 22a of the mirror cam gear 22 and the cam follower 36a of the mirror driving lever 36 is released by the rotation of the mirror cam gear 22 in a counterclockwise direction.

Then, the position detector 23 provided with the mirror cam gear 22 so as to detect the position of the mirror cam gear 22 reaches to the completed position of the mirror-down main brake zone 38d of the pattern portion 38 of the flexible printed substrate (a position of (2) illustrated in FIG. 5).

The mirror unit including the main mirror 6 is held on the mirror-down position until this state.

Further, energization to the motor 47 is continued, the mirror cam gear 22 is rotated through the reduction gear 48, and the mirror driving mechanism is transited to the state during the mirror-up operation.

3: State During Mirror-Up Operation

Figure 4C:
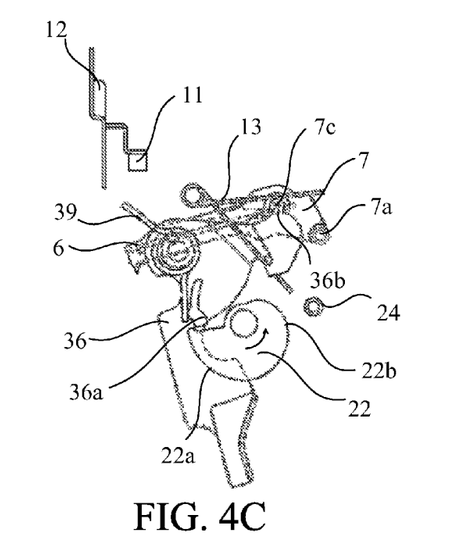

FIG. 4C illustrated the state of each component of the mirror driving mechanism during the mirror-up operation.

The abutment of the cam top portion 22a of the mirror cam gear 22 and the cam follower 36a of the mirror driving lever 36 starts to release by the rotation of the mirror cam gear 22 in a counterclockwise direction. The mirror driving lever 36 starts to rotate centering on the axis portion 8b of the mirror box 8 in a counterclockwise direction by urging force of the mirror-up spring 39.

After the mirror driving lever 36 rotates by the predetermined amount, the cam portion 36b of the mirror driving lever 36 abuts against the axis portion 7c of the main mirror holding member 7 and pushes it so that the main mirror unit including the main mirror 6 starts to rotate in a mirror-up operational direction (a clockwise direction).

The sub mirror 105 and the sub mirror holding member 109 also start to rotate in the mirror-up operational direction in tandem with the operations of the main mirror 6 and the main mirror holding member 7.

Further, energization to the motor 47 is continued, the mirror cam gear 22 is rotated through the reduction gear 48, and the mirror driving mechanism is transited to a mirror-up position arrival state.

4: Mirror-Up Position Arrival State

Figure 4D:
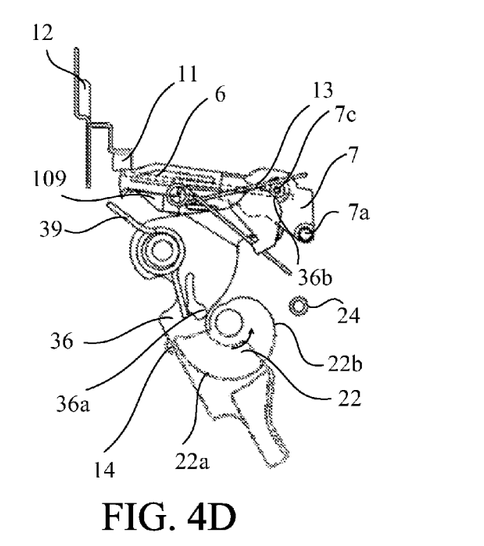

FIG. 4D illustrates the state of each component of the mirror driving mechanism when arriving at the mirror-up position.

The cam portion 36b of the mirror driving lever 36 abuts against the axis portion 7c of the main mirror holding member 7 and pushes it so that the main mirror holding member 7 holding the main mirror 6 abuts against a mirror-up stopper 11 positioned on the mirror-up stopper holding member 12. Therefore, the main mirror 6 and the main mirror holding member 7 are held on the mirror-up position.

The sub mirror 105 and the sub mirror holding member 109 also reaches the mirror-up position in tandem with the operations of the main mirror 6 and the main mirror holding member 7. The sub mirror holding member 109 urged in the mirror-up operational direction by a spring (not shown) abuts against the main mirror holding member 7. Therefore, the sub mirror 105 and the sub mirror holding member 109 are held on the mirror-up position.

The position detector 23 reaches to a start position of a mirror-up preliminary brake zone 38a of the pattern portion 38 of the flexible printed substrate (a position of (3) illustrated in FIG. 5) at almost same timing as the above operation (a timing is some shifted by image-pickup condition, environmental condition, and component tolerance). The mirror-up preliminary brake zone 38a is a zone so as to reduce the rotational speed of the mirror cam gear 22.

The speed of the mirror cam gear 22 is reduced since the mirror controller 61 controls the output to the motor 47 by through the system controller 53. Here, the control of the output to the motor 47 by the mirror controller 61 through the system controller 53 is PWM control (Duty ratio is set so as to make the output constant regardless of power-supply voltage in this embodiment). Duty ratio is a ratio of on time in output time with respect to a period. Speed reduction of the mirror cam gear 22 by PWM control is operated so as to suppress variability of a stop position of the mirror cam gear 22 in a mirror-up main brake zone 38b described below.

Further, the output to the motor 47 by PWM control is continued, the mirror cam gear 22 is rotated through the reduction gear 48, and the mirror driving mechanism is transited to a mirror-up main brake start state.

5: Mirror-Up Main Brake Start State

Figure 4E:
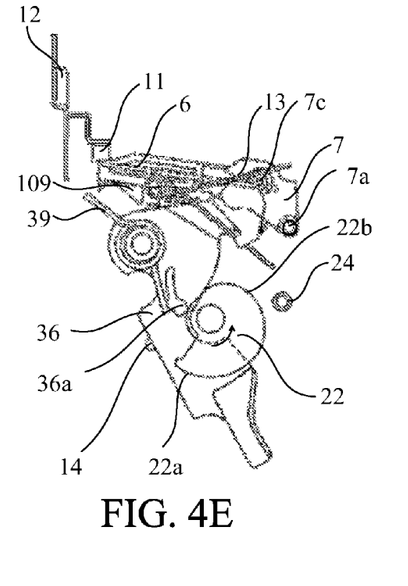

FIG. 4E illustrates the state of each component of the mirror driving mechanism when the mirror-up main brake is started.

The position detector 23 reaches to a start position of the mirror-up main brake zone 38b of the pattern portion 38 of the flexible printed substrate (a position of (4) illustrated in FIG. 5). The mirror-up main brake zone 38b is a zone so as to stop the rotation of the mirror cam gear 22 when the mirror-up operation is completed.

When the circuit of the motor 47 is short-circuited and the rotation of the mirror cam gear 22 is stopped through the reduction gear 48 under such a condition, each component starts to stop and the mirror driving mechanism is transited to a mirror-up operation completed state.

6: Mirror-Up Operation Completed State

Figure 4F:
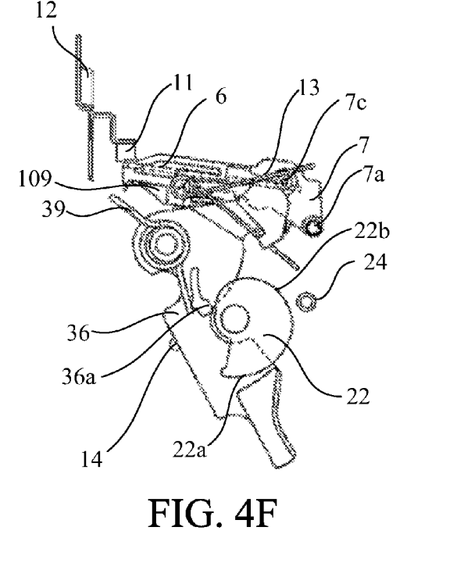

FIG. 4F illustrates the state of each component of the mirror driving mechanism when the mirror-up operation is completed, and each component including the mirror cam gear 22 stops at the state illustrated in FIG. 4F.

The position detector 23 is positioned at the mirror-up main brake zone 38b of the pattern portion 38 of the flexible printed substrate (a position of (5) illustrated in FIG. 5).

<Mirror-Down Operation>

In the above mirror-up operation completed state, the motor 47 is energized, the mirror cam gear 22 is rotated centering on the axis portion 8a of the mirror box 8 in a counterclockwise direction through the reduction gear 48, and the mirror driving mechanism is transited to a mirror-down standby state.

7: Mirror Down Standby State

Figure 4G:
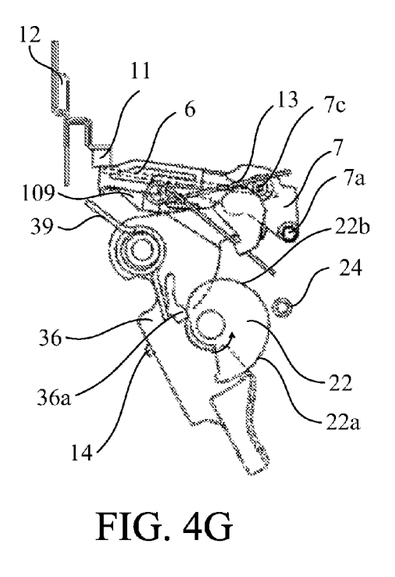

FIG. 4G illustrates the state of each component of the mirror driving mechanism before the start of the mirror-down operation.

The cam lift portion 22b of the mirror cam gear 22 starts to abut against the cam follower 36a of the mirror driving lever 36 by rotating the mirror cam gear 22 in a counterclockwise direction.

Then, the position detector 23 reaches to the completed position of the mirror-up main brake zone 38b of the pattern portion 38 of the flexible printed substrate (a position of (6) illustrated in FIG. 5).

The mirror unit including the main mirror 6 is held on the mirror-up position until this state.

Further, energization to the motor 47 is continued, the mirror cam gear 22 is rotated through the reduction gear 48, and the mirror driving mechanism is transited to the state during the mirror-down operation.

8: State During Mirror-Down Operation

Figure 4H:
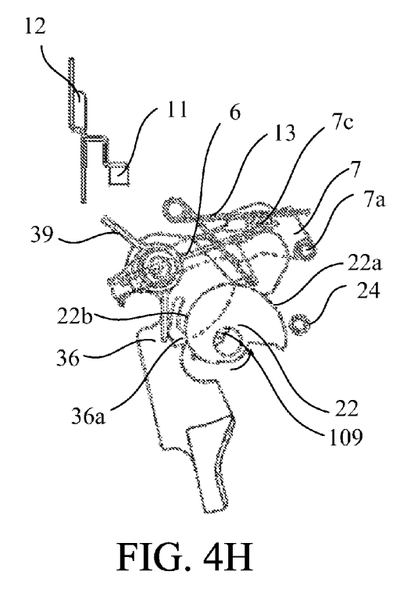

FIG. 4H illustrates the state of each component of the mirror driving mechanism during mirror-down operation.

The mirror driving lever 36 rotates in a clockwise direction in FIG. 4H against the urging force of the mirror-up spring 39 since the cam lift portion 22b of the mirror cam gear 22 pushes the cam follower 36a of the mirror driving lever 36 along with the rotation of the mirror cam gear 22.

The axis portion 7c of the main mirror holding member 7 holding the main mirror 6 is urged in a down direction by the mirror-down spring 13, and the mirror unit including the main mirror 6 is driven in the mirror-down direction along with the operation of the mirror driving lever 36.

Then, the position detector 23 is positioned at a position of the ground portion 38e of the pattern portion 38 of the flexible printed portion (a position of (7) illustrated in FIG. 5).

Further, energization to the motor 47 is continued, the mirror cam gear 22 is rotated through the reduction gear 48, and the mirror driving mechanism is transited to a mirror-down position arrival state.

9: Mirror-Down Position Arrival State

Figure 4I:
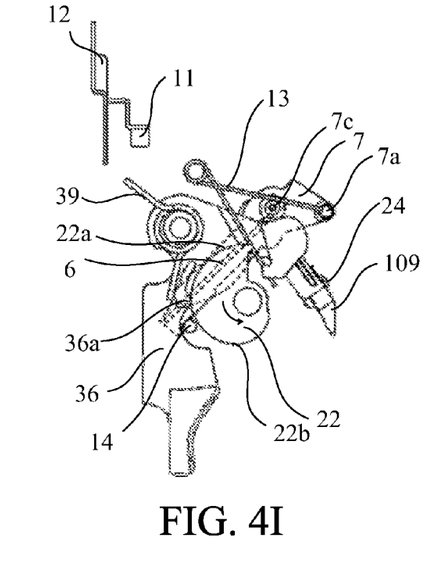

FIG. 4I illustrates the state of each component of the mirror driving mechanism when arriving at the mirror-down position.

The cam follower 36a of the mirror driving lever 36 abuts against end position of the cam lift portion 22b and start point of the cam top position 22a of the mirror cam gear 22 by rotating the mirror cam gear 22 in a counterclockwise direction.

After moving from the mirror-up position to the mirror-down position, the charged mirror-up spring 39 is held on through the mirror driving lever 36.

The axis portion 7c of the main mirror holding 7 holding the main mirror 6 is urged in the mirror down direction by the mirror-down spring 13 and the main mirror holding member 7 abuts against the main mirror down stopper 14 arranged inside the mirror box 8. Therefore, the main mirror 6 and the main mirror holding member 7 are held on the mirror-down position.

The sub mirror 105 and the sub mirror holding member 109 also reaches to the mirror-down position in tandem with the operations of the main mirror 6 and the main mirror holding member 7. The sub mirror holding member 109 urged in the mirror-down direction by a spring (not shown) abuts against the sub mirror down stopper 24 arranged inside the mirror box 8. Therefore, the sub mirror 105 and the sub mirror holding member 109 are held on the mirror-down position.

The position detector 23 reaches to a start position of a mirror-down preliminary brake zone 38c of the pattern position 38 of the flexible printed substrate (a position of (8) illustrated in FIG. 5). The mirror-down preliminary brake zone 38c is a zone so as to reduce the rotational speed of the mirror cam gear 22.

The speed of the mirror cam gear 22 is reduced since the mirror controller 61 controls the output to the motor 47 through the system controller 53. Here, the control of the output to the motor 47 by the mirror controller 61 through the system controller 53 is PWM control. Speed reduction of the mirror cam gear by PWM control is operated so as to suppress variability of a stop position of the mirror cam gear in the mirror-down main brake zone 38d described below.

Further, the output to the motor 47 by PWM control is continued, the mirror cam gear 22 is rotated through the reduction gear 48, and the mirror driving mechanism is transited to a mirror-down main brake start state.

10: Mirror-Down Main Brake Start State

Figure 4J:
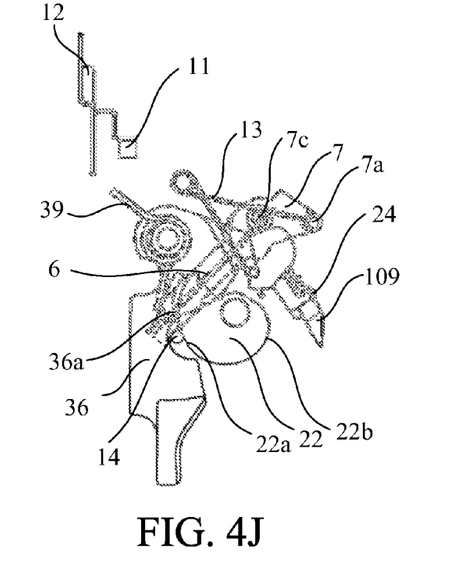

FIG. 4J is the state of each component of the mirror driving mechanism when the mirror-down main brake is started.

The position detector 23 reaches to a starting position of the mirror-down main brake zone 38d of the pattern portion 38 of the flexible printed substrate (a position of (10) illustrated in FIG. 5). The mirror-down main brake zone 38d is a zone for stopping the rotation of the mirror cam gear 22 when the mirror-down operation is completed.

When the circuit of the motor 47 is short-circuited and the rotation of the mirror cam gear 22 is stopped through the reduction gear 48 under such a condition, each component starts to stop and the mirror driving mechanism is transited to the initial state as previously mentioned.

Next, the state of each component of the mirror driving mechanism in the silent sound shooting mode (the second mirror driving mode) where the mirror unit including the main mirror 6 is driven at the low speed (a second speed) is described.

<Mirror-Up Operation>

11: Initial State

The state of each component is almost the same state described in "1: Initial state" in the normal shooting mode.

When the operation of taking an image by the release button 2 is started, the motor 47 is energized and the mirror cam gear 22 is rotated in a clockwise direction (a second direction) centering on the axis portion 8a of the mirror box 8 through the reduction gear 48 and the mirror driving mechanism transits to "12: State when starting pre-flash operation".

In the silent sound shooting mode, the mirror cam gear 22 is rotated in a direction opposite to the rotational direction of the mirror cam gear 22 in the normal shooting mode.

The rotational speed of the mirror cam gear 22 is set so as to be lower than the rotational speed of the mirror-up operation in the normal shooting mode as described above. Here, output control to the motor by the mirror controller 61 through the system controller 53 is PWM control.

12: State when Starting Pre-Flash Operation

Figure 4K:
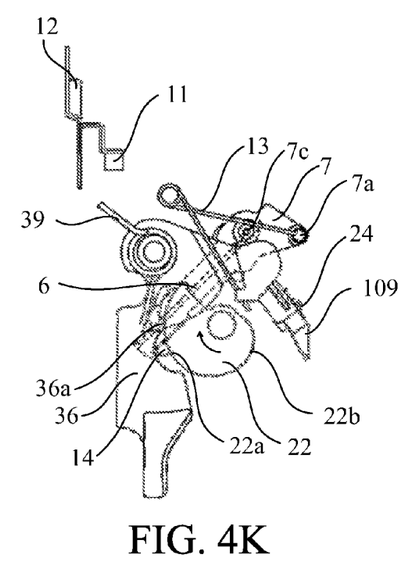
Figure 4L:
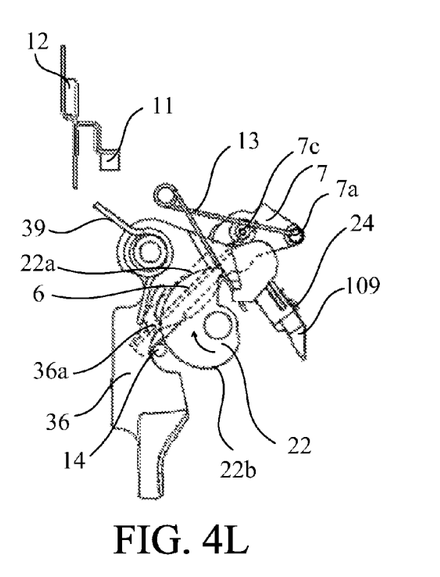

FIG. 4K illustrates the state of each component of the mirror driving mechanism when the built-in strobe 3 starts pre-flush operation.

After starting the rotation of the mirror cam gear 22 in a clockwise direction, abutment of the cam top portion 22a of the mirror cam gear 22 and the cam follower 36a of the mirror driving lever 36 is maintained and the mirror driving mechanism transits from the initial state to the state of FIG. 4K.

Then, the position detector 23 passes through the mirror-down main brake zone 38d of the pattern portion 38 of the flexible printed substrate and reaches to a starting position of the mirror-down preliminary brake zone 38c (a position of (9) illustrated in FIG. 5).

When taking an image by using the built-in strobe 3, pre-flush operation of the built-in strobe 3 for photometry operation is operated on this timing.

Further, the output to the motor 47 by PWM control is continued, the mirror cam gear 22 is rotated through the reduction gear 48, and the mirror driving mechanism is transited to the stated before the mirror-up operation.

13: State Before the Mirror-Up Operation

Figure 4M:
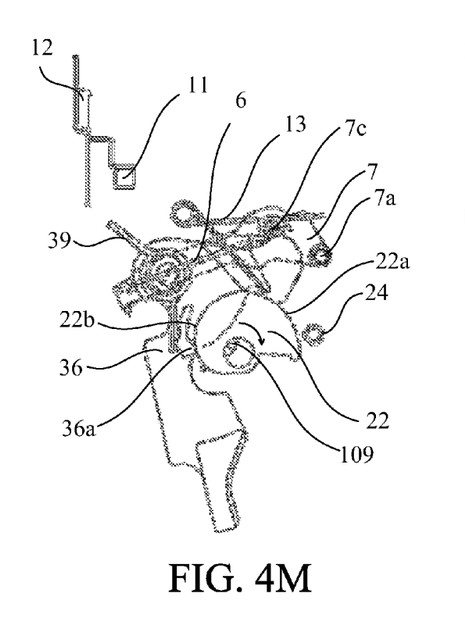

FIG. 4M illustrates the state of each component of the mirror driving mechanism before the mirror-up operation.

The mirror driving mechanism is transited to the state where the end position of the cam top portion 22a and the start position of the cam lift portion 22b of the mirror cam gear 22 abut against the cam follower 36a of the mirror driving lever 36 by the rotation of the mirror cam gear 22 in a clockwise direction.

Then the position detector 23 reaches to the end position of the mirror-down preliminary brake zone 38c of the pattern portion 38 of the flexible printed substrate (a position of (8) illustrated in FIG. 5).

The mirror unit including the maim mirror 6 is hold on the mirror-down position until this state.

When taking an image by using the built-in strobe 3, the photometry operation by pre-flash operation of the built-in strobe 3 is operated between the state when starting pre-flash operation and the state before mirror-up operation. Pre-flush operation of the built-in strobe 3 is operated, the light flux which is reflected by the object and is passed through the lens group 204 of the image-pickup lens 201 is led to the photometry sensor 9 provided near the finder by the main mirror 6 positioned at the mirror-down position, and the photometry operation is operated.

The rotational speed of the mirror cam gear is set to be the first speed so that the time required for the mirror cam gear 22 to rotate from the start position to the end position of the mirror-down preliminary brake zone 38c is longer than the time required for the photometry operation by pre-flush operation of the built-in strobe 3.

Further, the output to the motor 47 by PWM control is continued, the mirror cam gear 22 is rotated through the reduction gear 48, and the mirror driving mechanism is transited to the state during mirror-up operation.

In the following mirror-up operation in the silent sound mode, the rotational speed of the mirror cam gear 22 may be set so as to be faster than the first rotational speed until the state before the mirror-up operation to be slower than the rotational speed during the mirror-up operation in the normal shooting mode.

14: State During the Mirror-Up Operation

FIG. 4M illustrates the state of each component of the mirror driving mechanism during the mirror-up operation.

When the mirror cam gear 22 is rotated in a clockwise direction, the mirror driving lever 36 starts to rotate in the mirror-up operational direction centering on the axis portion 8b of the mirror-box 8 by the urging force of the mirror-up spring 39. Then, abutment of the cam lift portion 22b of the mirror cam gear 22 and the cam follower 36a of the mirror driving lever 36 is maintained.

After the mirror driving lever 36 rotates by the predetermined amount, the cam portion 36b of the mirror driving lever 36 abuts against the axis portion 7c of the main mirror holding member 7 and pushes it, and the mirror unit including the main mirror 6 is started to rotate in the mirror-up operational direction.

The sub mirror 105 and the sub mirror holding member 109 are also started to rotate in the mirror-up operational direction in tandem with the operation of the main mirror 6 and the main mirror holding member 7.

Then, the position detector 23 is positioned at the position of the ground portion 38e of the pattern portion 38 of the flexible printed substrate (a position of (7) illustrated in FIG. 5).

Further, the output to the motor 47 by PWM control is continued, the mirror cam gear 22 is rotated through the reduction gear 48, and the mirror driving mechanism is transited to the mirror-up arrival state.

15: Mirror-Up Position Arrival State

Figure 4N:
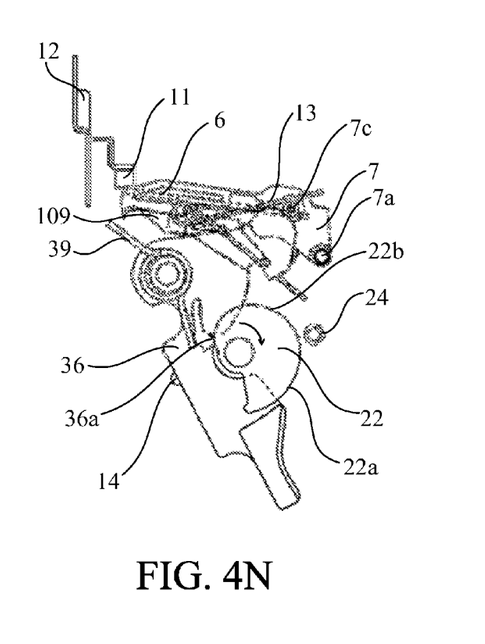

FIG. 4N illustrates the state of each component of the mirror driving mechanism when the mirror driving mechanism reaches to the mirror-up position.

When the mirror cam gear 22 rotates in a clockwise direction, the mirror driving state is transited to the state before abutment of the cam lift portion 22b of the mirror cam gear 22 and the cam follower 36a of the mirror driving lever 36 is released.

When the cam portion 36b of the mirror driving lever 36 abuts against the axis portion 7c of the main mirror holding member 7 and pushes it, the main mirror holding member holding the main mirror 6 abuts against the mirror-up stopper 11 positioned on the mirror-up stopper holding member 12. Therefore, the main mirror 6 and the main mirror holding member 7 are held on the mirror-up position.

The sub mirror 105 and the sub mirror holding member 109 also reach to the mirror-up position in tandem with the main mirror 6 and the main mirror holding member 7. The sub mirror holding member 109 urged in the mirror-up operational direction by the spring (not shown) abuts against the main mirror holding member 7. Therefore, the sub mirror 105 and the sub mirror holding member 109 are held on the mirror-up position.

The position detector 23 reaches to a start position of a mirror-up main brake zone 38b of the pattern portion 38 of the flexible printed substrate (a position of (6) illustrated in FIG. 5) at almost same timing as the above operation (a timing is some shifted by image-pickup condition, environmental condition, and component tolerance).

When the circuit of the motor 47 is short-circuited and the rotation of the mirror cam gear 22 is stopped through the reduction gear 48 under such a condition, each component starts to stop and the mirror driving mechanism is transited to the mirror-up operation completed state.

16: Mirror Up Operation Completed State

The state of each component is almost the same states as described in "6: Mirror-up operation completed state" in the normal shooting mode.

<Mirror-Down Operation>

The operation of each component during the mirror-down operation in the silent sound mode is almost the same operation of each component during the mirror-down operation in the normal shooting mode.

That is to say, in "16: Mirror-up operation completed state", the motor 47 is energized, the mirror cam gear 22 is rotated in a counterclockwise direction centering on the axis portion 8a of the mirror box 8 through the reduction gear 48, and the mirror driving mechanism is transited to "7: Mirror down standby state".

Afterwards, the mirror driving mechanism is transited to "1: Initial state" through each state.

However, the output control to the motor 47 from "16: Mirror-up operation completed state" to "9: Mirror-down arrival state" by the mirror controller 61 through the system controller 53 may be PWM control. As a result, the mirror-down speed of the mirror unit in the silent sound mode can be slower than the mirror-down speed in the normal shooting mode. Therefore, the mirror-down operational sound of the silent sound mode can suppress lower than that of the normal shooting mode.

Figure 6A:
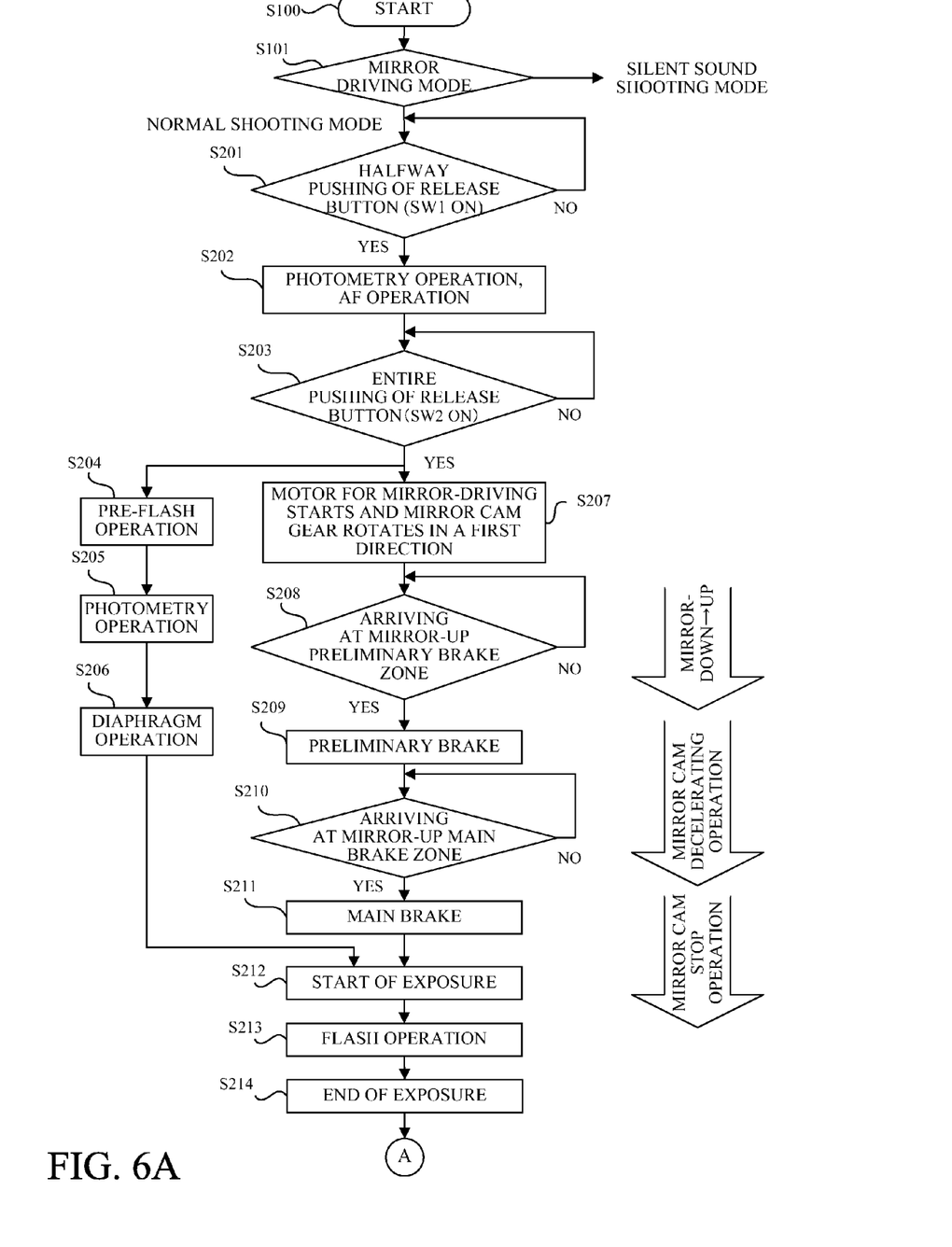
FIGS. 6A and 6B are flow charts (from an initial state to an exposure completion) illustrating a processing operation of the image-pickup apparatus.
Figure 6B:
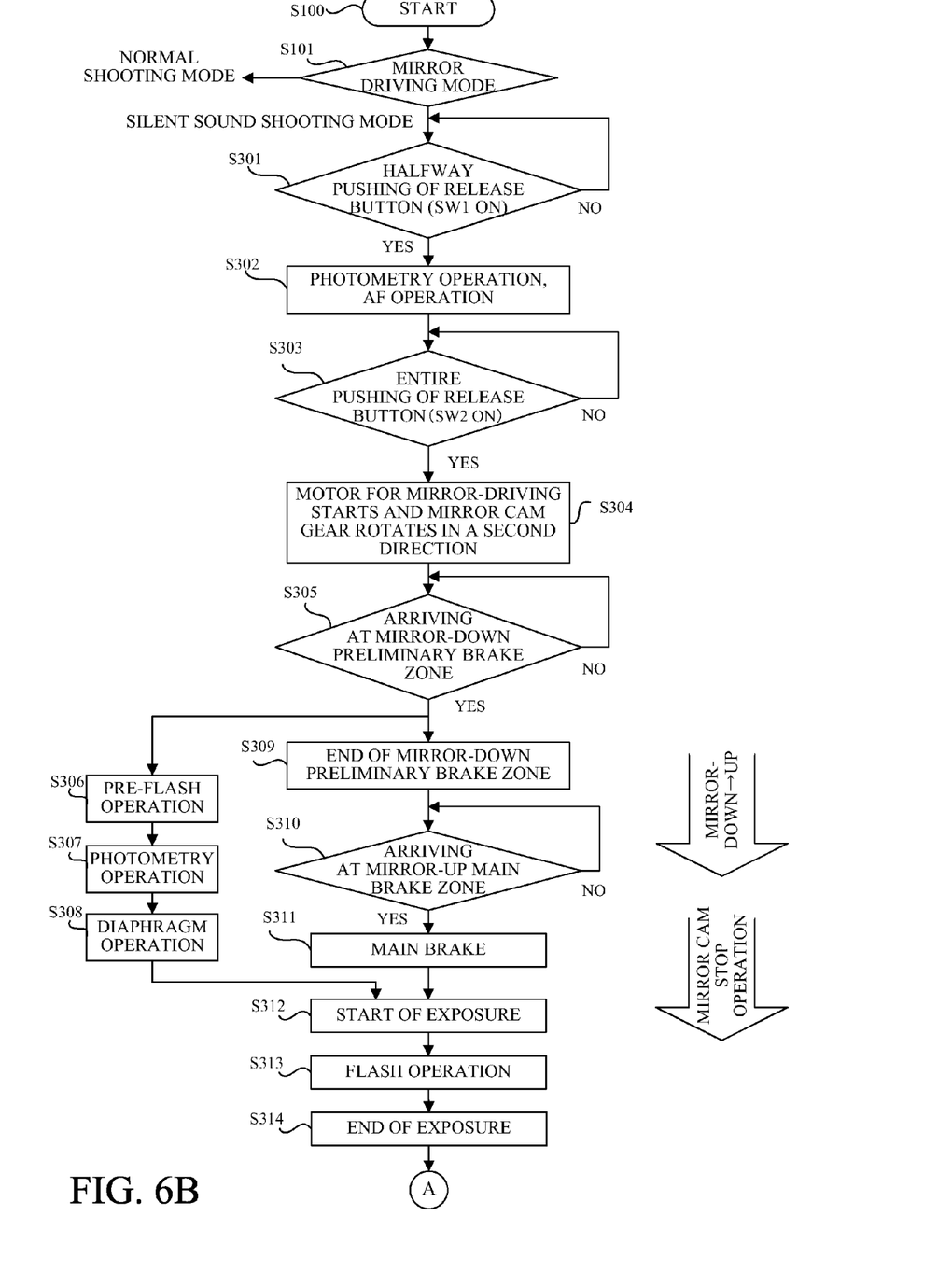
Figure 7:
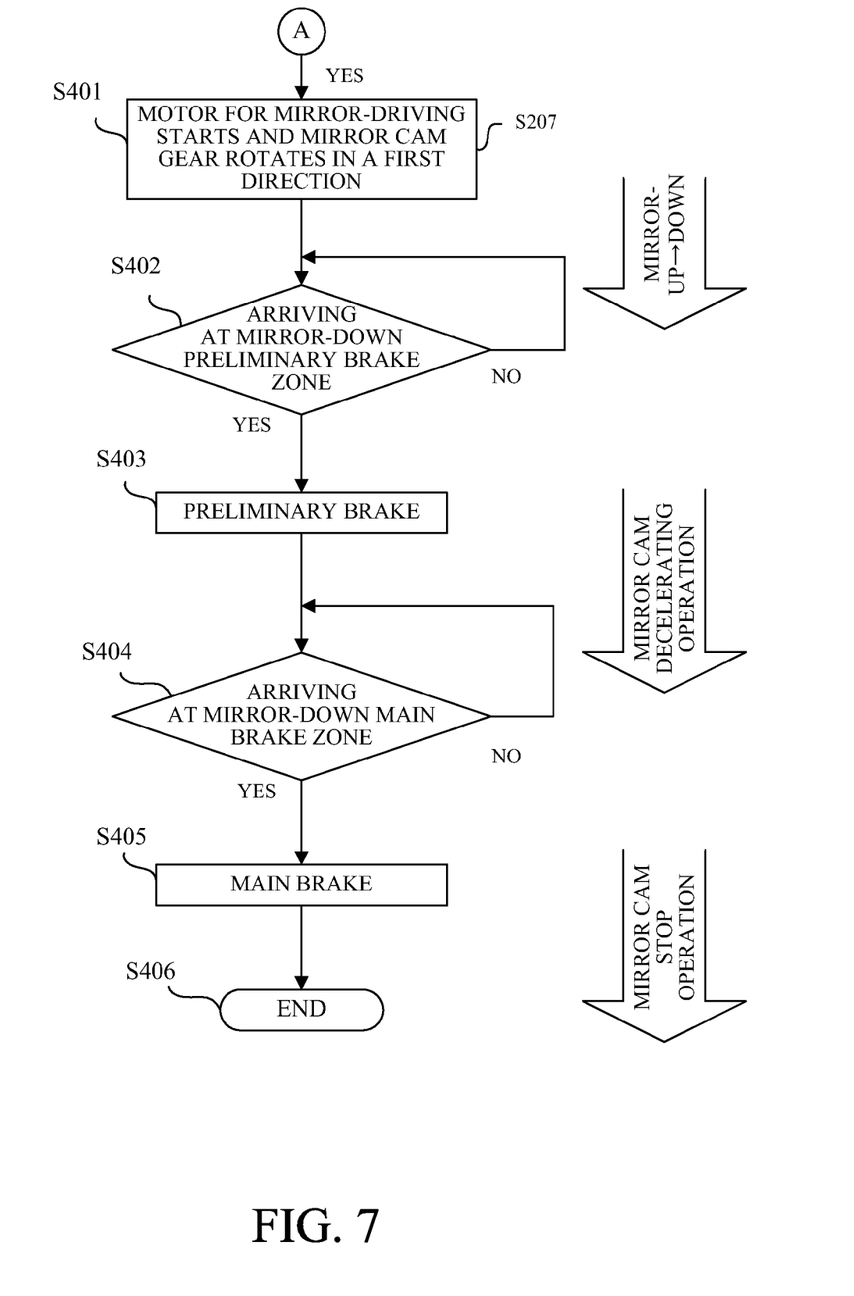
FIG. 7 is a flow chart (until an operation end after completing the exposure) illustrating the processing operation of the image-pickup apparatus.

FIGS. 6A, 6B and FIG. 7 are flow charts illustrating a processing operation when the image-pickup apparatus 101 of this embodiment takes a picture with a strobe. FIGS. 6A and 6B are flow charts from the initial state to an exposure completion, and FIG. 7 is a flow chart until an operation end (=the initial state) after completing the exposure.

The operation of the image-pickup apparatus 101 is started at step (abbreviated a S in figures) 100 in FIGS. 6A and 6B.

Whether shooting mode selected by the mirror driving mode selection button 5 is the normal shooting mode or the silent sound shooting mode is judged at step 101. The process advances to step 201 selected in the case of the normal shooting mode and the process advances to step 301 in the case of the silent sound shooting mode.

Hereinafter, steps 201-214 from the initial state until an exposure completion in the processing operation of the image-pickup apparatus in the normal shooting mode are explained.

Whether the release button 2 is operated as halfway pushing or not is judged at step 201. The process advances to step 202 in the case where the halfway pushing of the release button 2 is operated and step 201 is continued in the case where the halfway pushing of the release button 2 is not operated.

Photometry operation and AF (automatic focusing) operation as shooting preparation operation is operated at step 202. An aperture and an exposure time are decided based on the result of the photometry operation.

Next, the process advances to step 203, and whether the release button 2 is operated as entire pushing or not is judged. The process advances to steps 204 and 207 in the case where the entire pushing of the release button 2 is operated and step 203 is continued in the case where the entire pushing of the release button 2 is not operated.

Pre-flash operation of the built-in strobe 3 is operated at step 204.

Next, the process advances to step 205, light flux which is reflected by the object and is passed through the lens group 204 of the image-pickup lens 201 is led to the photometry sensor 9 provided near the finder by the main mirror 6 positioned at the mirror-down position. The process advances to step 206 after operating photometry operation for measuring brightness of the object.

At step 206, the diaphragm 205 is driven based on the aperture set at step 202.

At step 207 advancing at the same time where the process advances to step 204, the mirror controller starts output to the motor 47 through the system controller 53 and the mirror cam gear 22 is rotated in a counterclockwise direction of FIGS. 4A-4N. The output to the motor 47 by the mirror controller 61 through the system controller 53 is set to be higher than the output to the motor 47 on the mirror-up operation of the silent sound shooting mode. Here, the output to the motor 47 by the mirror controller 61 through the system controller 53 is controlled by PWM control (duty ratio is 100% in this embodiment).

The main mirror 6 before starting the mirror-up operation is positioned at the mirror-down position. As described in "2: Mirror-up operation start state", the mirror driving lever 36 is not rotated from the start of rotation of the mirror cam gear 22 to releasing abutment of the cam top portion 22a of the mirror cam gear 22 and the cam follower 36a of the mirror driving lever 36. Therefore, the main mirror 6 is held on the mirror-down position. The operations of steps 204 and 205 are operated during this time.

The operation of step 207 may be operated after passing predetermined time (e.g. 5 ms) from the operation of step 204 so as to further acquire the operation time of steps 204 and 205.

Further, the mirror cam gear 22 is rotated and the abutment of the cam top portion 22a of the mirror cam gear 22 and the cam follower 36a of the mirror cam driving lever 36 is released. By releasing the abutment with the cam top 22a, the mirror driving lever 36 is rotated and the mirror-up operation from the mirror-down position to the mirror-up position of the main mirror 6 is operated.

Next, the process advances to step 208, and the process advances to step 209 when the mirror cam gear 22 reaches to the mirror-up preliminary brake zone 38a so as to reduce the rotational speed of the mirror cam gear 22.

At step 209, the output to the motor 47 by the mirror controller 61 through the system controller 53 is controlled and the reduction of rotational speed of the mirror cam gear 22 is operated. Here, as previously explained, the output to the motor 47 by the mirror controller 61 through the system controller 53 is controlled by PWM control.

Next, the process advances to step 210, and the process advances to step 211 when the mirror cam gear 22 reaches to the mirror-up main brake zone 38b so as to stop the rotation of the mirror cam gear 22.

At step 211, the circuit of the motor 47 is short-circuited by the mirror controller 61 through the system controller 53 and the rotation of the mirror cam gear 22 is controlled so as to stop. Then, the main mirror 6 is positioned at the mirror-up position.

When both operations of steps 206 and 211 are completed, the process advances to step 212.

At step 212, the exposure of the image-pickup element 116 is started by travelling a leading blade of the focal plane shutter 1 so as to make the shatter opening part an opening state.

Next, the process advances to step 213, and flash operation is operated by the built-in strobe 3. Amount of luminescence of this flash-operation is decided based on the photometric value acquired at step 205 so as to expose the image-pickup image properly by the aperture and the exposure time set at step 202.

Next, the process advances to step 214, and the exposure to the image-pickup element 116 is completed by travelling the trailing blade of the focal plane shutter 1 so as to make the shutter opening part a close state.

Shooting of short release time rag can be operated since the rotational speed of the mirror cam gear 22 and the mirror-up operation of the main mirror 6 of the normal shooting mode are faster than that of the silent sound shooting mode. In other words, since an interval from the pre-flush operation of step 204 to the flash operation of step 213 is short, the exposure operation is completed before the objects reflexively close their eyes by pre-flash operation and preferable image can be acquired.

Hereinafter, steps 301 to 313 which are from the initial state to the exposure completion are explained in the processing operation of the image-pickup apparatus 101 in the silent shooting mode At step 301, the release button 2 is distinguished whether the halfway pushing operation of the release button 2 is operated. The process advances to step 302 in the case where the halfway pushing operation of the release button 2 is operated, and step 301 is repeated in the case where the halfway pushing operation of the release button 2 is not operated.

At step 302, a photometry operation and AF (automatic focusing) as image-pickup preparation operation are operated. The aperture and the exposure time are decided based on the result of the photometry.

Next, at step 303, the release button 2 is distinguished whether the entire pushing operation of the release button 2 is operated. The process advances to step 304 in the case where the entire pushing operation of the release button 2 is operated, and step 303 is repeated in the case where the entire pushing operation of the release button 2 is not operated.

At step 304, the output to the motor 47 is started by the mirror controller 61 through the system controller 53 and the mirror cam gear 22 is rotated in a clockwise direction of FIG. 4. The output to the motor 47 by the mirror controller 61 through the system controller 53 is set to be lower than output of the mirror-up operation in the normal shooting mode. Here, the output to the motor 47 by the mirror controller 61 through the system controller 53 is controlled by PWM control. Setting criterion of duty ratio is explained in detail when step 309 is explained.

Next, the process advances to step 305, and the process advances to steps 306 and 309 when the mirror cam gear 22 reaches on the mirror-down preliminary brake zone 38c so as to reduce the rotational speed of the mirror cam gear 22 on the mirror-down operation.

At step 306, the pre-flash operation by the built-in strobe 3 is operated.

Next, the process advances to step 307, the light flux which is reflected by the object and is passed through the lens group 204 of the lens 201 is led to the photometry sensor 9 arranged near the finder by the main mirror 6 positioned at the mirror-down position. The process 308 advances to step 308 after photometry operation measuring object brightness.

At step 308, the diaphragm 205 is driven based on the aperture set at step 302.

At step 309 advancing at the same time where the process advances to step 306, the mirror cam gear 22 is away from the mirror-down preliminary brake zone 38c so as to reduce the rotational speed of the mirror cam gear 22 on the mirror-down operation.

The main mirror 6 before starting the mirror-up operation is positioned at the mirror-down position. As explained in "13: State before the mirror-up operation", the main mirror 6 is held on the mirror-down position from the start of the rotation of the mirror cam gear 22 until step 309 where the abutment of the cam top portion 22a of the mirror cam gear 22 and the cam follower 36a of the mirror driving lever 36 is released.

Steps 306 and 307 are operated between step 305 and step 309. The rotational speed of the mirror cam gear 22 from step 304 to step 309 is set a first rotational speed so that time from step 305 to step 309 is longer than measurement time required for the photometry operation on steps 306 and 307.

Then, the output to the motor 47 by the mirror controller 61 through the system controller 53 is controlled by PWM control so that the rotational speed of the mirror cam gear 22 is the first rotational speed.

Further, the mirror cam gear 22 is rotated, the abutment of the cam lift portion 22b of the mirror cam gear 22 and the cam follower 36a of the cam lift 36 is maintained, and the mirror-up operation of the main mirror 6 is operated by the rotation of the mirror driving lever 36.

Next, the process advances to step 310, and the process advances to step 311 when the mirror cam gear 22 reaches to the mirror-up main brake zone 38b so as to stop the rotation of the mirror cam gear 22. The rotational speed of the mirror cam gear 22 after passing the mirror down preliminary brake zone 38c from step 309 to step 310 is a second rotational speed which is faster than the first rotational speed and is slower than the rotational speed of the mirror-up operation in the normal shooting mode.

The output to the motor 47 by the mirror controller through the system controller 53 is controlled by PWM control so that the rotational speed of the mirror cam gear 22 becomes a second rotational speed.

At step 311, the circuit of the motor 47 by the mirror controller 61 through the system controller is short-circuited and the mirror cam gear 22 is controlled so as to stop the rotation thereof. Then, the main mirror 6 is positioned at the mirror-up position.

The process advances to step 312 when both operations of steps 308 and 311 are completed.

At step 312, the exposure to the image-pickup element 116 is started by travelling the leading blade of the focal plane shutter 1 so as to make the shutter opening an opening state.

Next, the process advances to step 313, and the flash operation by the built-in strobe 3 is operated. The amount of luminescence of the flash operation is decided based on the photometry value acquired in step 307 so that exposure to the image becomes proper by the aperture and the exposure time set at step 302.

Next, the process advances to step 314, and the exposure to the image-pickup element 116 is completed by travelling the trailing blade of the focal plane shutter 1 so as to make the shutter opening a close state.

In the silent sound shooting mode as explained above, the rotational speed of the mirror cam gear 22 and the mirror-up operation of the main mirror 6 are slower compared with the normal shooting mode, and release time rag becomes longer.

However, since an interval from the pre-flash operation at step 306 to the flash operation at step 313 can be also shorter in the silent sound shooting mode, the exposure operation is completed before the objects reflexively close their eyes by the pre-flush operation and preferable image can be acquired.

Also, the sound of the mirror-up operation can suppress compared with the normal shooting mode by making the rotational speed of the mirror cam gear 22 from step 309 until step 310 the second rotational speed.

Hereafter, the processing operation of the image-pickup apparatus 101 in the normal shooting mode and the silent sound mode until an operation end (=initial state) after completing the exposure from step 401 until step 406 is explained by FIG. 7.

At step 401, the output to the motor 47 by the mirror controller 61 through the system controller 53 is started and the mirror cam gear 22 is rotated in a counterclockwise direction of FIG. 4F.

The cam lift portion 22b of the mirror cam gear 22 abuts against the cam follower 36a of the mirror driving lever 36 by the rotation of the mirror cam gear 22.

Afterwards, the mirror-down operation of the main mirror 6 is operated by the rotation of the mirror driving lever 36 since the above abutment is maintained along the shape of the cam lift portion 22b.

When the cam top portion 22a of the mirror cam gear 22 start to abut against the cam follower 36a of the mirror driving lever 36, the main mirror 6 reaches to the mirror-down position.

Here, each output to the motor 47 by the mirror controller 61 by the system controller 53 may set in the normal shooting mode and the silent sound shooting mode. In detail, the output to the motor 47 by the mirror controller 61 through the system controller 53 is controlled by PWM control (in this embodiment, the normal shooting mode; duty ratio 100%, silent sound shooting mode: duty ratio smaller than that of the normal shooting mode). Therefore, the sound of the mirror down operation in the silent sound shooting mode can suppress lower than the sound of the mirror-down operation in the normal shooting mode since the speed of the mirror-down operation in the silent sound mode can be slower than the speed of the normal shooting mode.

Next, the process advances to step 402 and the process advances to step 403 when the mirror cam gear 22 reaches to the mirror-down preliminary brake zone 38c so as to reduce the rotational speed of the mirror cam gear 22.

At step 403, the output to the motor 47 is controlled by the mirror controller 61 through the system controller 53, and the mirror cam gear is decelerated. Here, the output to the motor 47 by the mirror controller 61 through the system controller 53 is controlled by PWM control.

Next, the process advances to step 404, and the process advances to step 405 when the mirror cam gear 22 reaches to the mirror-down main brake zone 38d so as to stop the rotation of the mirror cam gear 22.

At step 405, the circuit of the motor 47 by the mirror controller 61 through the system controller 53 is short-circuited and the control so as to stop the rotation of the mirror cam gear 22 is operated.

Next, the process advances to step 406, and when each component stops, processing operation of the image-pickup apparatus 101 is completed and the state becomes the same as the state of step 100.

By the configuration of each component and operational timing of the present invention as explained above, the present invention provides an image-pickup apparatus having a preferable strobe emission so as to prevent images of closing one's eyes at a strobe shooting in both a normal shooting mode and a silent sound shooting mode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the built-in strobe 3 is used in this embodiment, but an external strobe may be used which is an accessory attached to the image-pickup apparatus 101.

This application claims the benefit of Japanese Patent Application No. 2012-205448, filed on Sep. 19, 2012, which is hereby incorporated by reference herein in its entirety.

What is claimed is:

1. An image-pickup apparatus comprising:
a release button configured to instruct start of taking an image;
a light emitting member configured to operate a flash operation for taking the image and a pre-flash operation for determining an amount of luminescence of the flash operation;
a mirror capable of moving between a first position where the mirror comes into an optical path so as to introduce a light beam to a finder and a second position where the mirror is retracted from the optical path;
a mirror driving member configured to drive the mirror;
a motor; and
a mirror cam member that has a cam portion transmitting a driving force from the motor to the mirror driving member,
wherein the image-pickup apparatus is operable in a first mirror driving mode where the motor rotates the mirror cam member in a first direction so as to move the mirror from the first position to the second position at a first speed and is operable in a second mirror driving mode where the motor rotates the mirror cam member in a second direction opposite to the first direction so as to move the mirror from the first position to the second position at a second speed slower than the first speed, and
wherein when the start of taking the image is instructed by the release button, the light emitting member starts the pre-flush operation before the mirror cam member starts to rotate in a case where the image-pickup apparatus operates in the first mirror driving mode, and the light emitting member starts the pre-flash operation after the mirror cam member starts to rotate in a case where the image-pickup apparatus operates in the second mirror driving mode.

2. The image-pickup apparatus according to claim 1, further comprising a controller configured to control the motor,
wherein after the mirror moves from the second position to the first position by rotating the mirror cam member in the first direction, the controller controls the motor so as to be in a preliminary brake zone for reducing the speed of the mirror cam member and a brake zone for stopping the mirror cam member in order, and
wherein in the case where the image-pickup apparatus operates in the second mirror driving mode, the light emitting member starts the pre-flash operation when the mirror cam member passes the brake zone and reaches the preliminary brake zone.

3. The image-pickup apparatus according to claim 2, further comprising a photometer configured to measure brightness of an object using reflected light of the object by the pre-flash operation when the mirror is positioned at the first position,
wherein in the case where the image-pickup apparatus operates in the second mirror driving mode, a rotational speed of the mirror cam member before the mirror cam member passes the preliminary brake zone after the start of taking the image is instructed by the release button is a first rotational speed at which a time to pass the preliminary brake zone is longer than a measurement time by the photometer.

4. The image-pickup apparatus according to claim 3, wherein the rotational speed of the mirror cam member after passing the preliminary brake zone in the case where the image-pickup apparatus operates in the second mirror driving mode is a second rotational speed that is not less than the first rotational speed and that is slower than a rotational speed in the case where the image-pickup apparatus operates in the first mirror driving mode.

5. The image-pickup apparatus according to claim 1, wherein the rotational speed of the mirror cam member in the case where the image-pickup apparatus operates in the second mirror driving mode is controlled by Pulse width modulation.

6. An image-pickup system comprising:
an image-pickup apparatus according to claim 1; and
an image-pickup lens detachable from the image-pickup apparatus.

* * * * *